United States Patent [19]
Krok

[11] 3,886,740
[45] June 3, 1975

[54] HYDRODYNAMIC TORQUE CONVERTER WITH HYDRAULICALLY ENERGIZED ONE-WAY ROLLER CLUTCH

[75] Inventor: Frank S. Krok, Detroit, Mich.

[73] Assignee: General Motors Corporation, Detroit, Mich.

[22] Filed: June 17, 1974

[21] Appl. No.: 480,045

[52] U.S. Cl. .................... 60/341; 60/367; 192/12 B
[51] Int. Cl. ............................................. F16d 33/00
[58] Field of Search ............ 60/327, 341, 361, 362, 60/367; 192/12 B

[56] References Cited
UNITED STATES PATENTS
3,476,226  11/1969  Massey ........................ 192/12 B X Primary Examiner—Edgar W. Geoghegan
Attorney, Agent, or Firm—F. J. Fodale

[57] ABSTRACT

A hydrodynamic torque converter in which a stator is mounted on a one-way roller clutch or brake operatively connected to a grounded sleeve. The one-way roller clutch has a roller energizer which urges the clutch rollers to a position of incipient wedging engagement between the clutch races responsive to the fluid flow conditions within the hydrodynamic torque converter during the torque multiplying and fluid coupling modes of operation.

2 Claims, 6 Drawing Figures

Patented June 3, 1975  3,886,740

HYDRODYNAMIC TORQUE CONVERTER WITH HYDRAULICALLY ENERGIZED ONE-WAY ROLLER CLUTCH

This invention relates to hydrodynamic torque converters and more particularly to hydrodynamic torque converters which use a one-way roller clutch for connecting the stator to a grounded member.

The one-way roller clutch prevents rotation of the stator in one direction allowing the torque converter to multiply input torque at low turbine speeds. As the turbine speed increases to pump speed, the one-way roller clutch permits the stator to overrun freely in the opposite direction allowing a smooth fluid coupled phase of operation between the pump and the turbine.

Prior to the present invention, the one-way roller clutches which have usually been employed in torque converters comprised individual tickler springs for each roller which reacted against a cage and maintained the rollers in a position of incipient wedging engagement between the races so that the clutch would overrun in one direction but immediately lock-up in response to forces tending to rotate the forces in the opposite direction. While these one-way roller clutches have been completely satisfactory in operation, the use of a large number of tickler springs of spring steel made the roller clutch expensive and difficult to assemble.

With this invention, the conventional one-way roller clutch is replaced by a one-way roller clutch which is less costly and easier to assemble by virtue of a simpler construction which makes advantageous use of the fluid flow conditions within the torque converter. In the preferred form of this invention, the roller clutch uses a roller energizer for locating the rollers of said roller clutch at a position of incipient wedging engagement with the clutch races responsive to the flow of hydraulic fluid in said hydraulic torque converter during the operation thereof, said roller energizer being mounted in said torque converter for rotation relative to said clutch races and having a plurality of fingers individually engaging said rollers and a plurality of paddles disposed in the hydraulic fluid between the outlet of said stator and the inlet of said pump.

The exact nature of this invention as well as other objects and advantages thereof will be readily apparent from consideration of the following specification relating to the annexed drawings in which.

Figure 1:
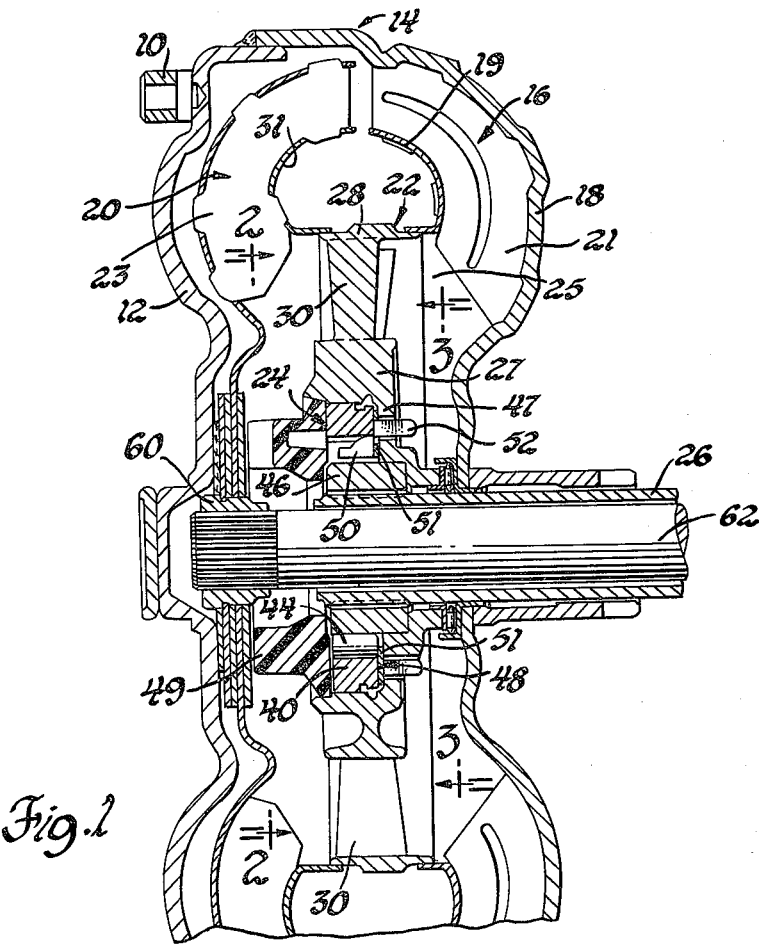
FIG. 1 is a side sectional view of a hydrodynamic torque converter in accordance with this invention.
Figure 4:
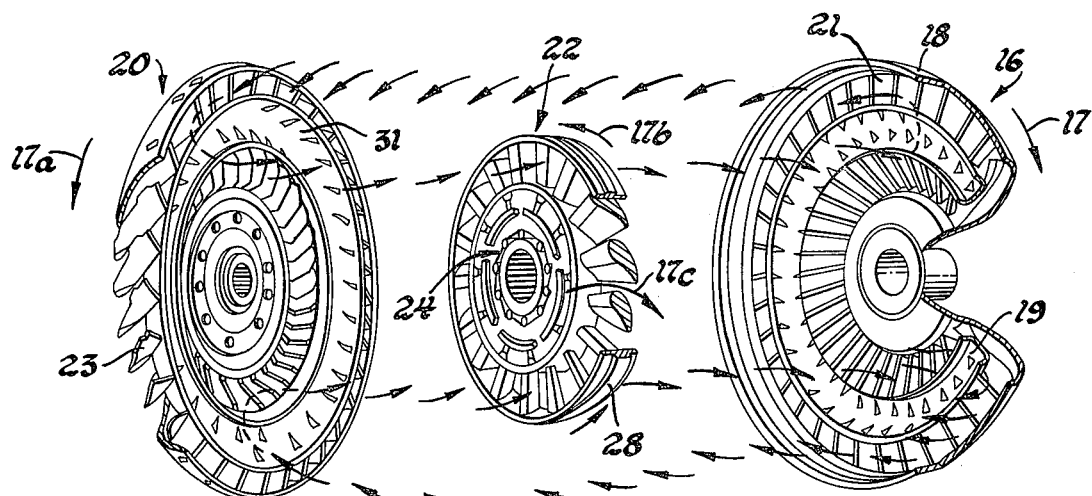
FIG. 4 is an exploded view of the hydrodynamic torque converter showing the path of converter oil flow during the torque multiplying phase of operation.
Figure 5:
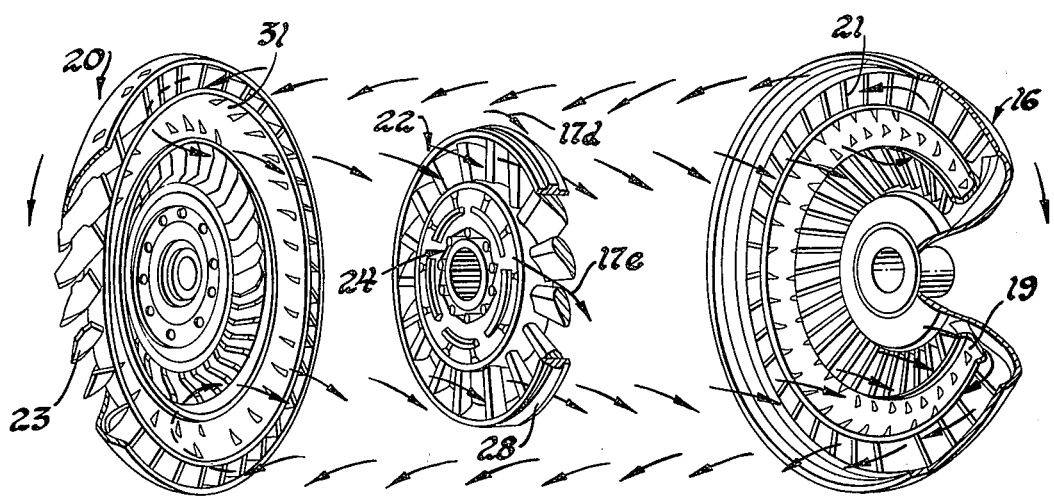
FIG. 5 is an exploded view of the hydrodynamic torque converter showing the path of converter oil flow during the fluid coupling phase of operation.

Referring now to FIG. 1, an input lug 10 is drivingly connected to the front cover 12 of a hydrodynamic torque converter 14. The torque converter has a bladed pump 16 operatively connected to a housing 18 welded to the front cover 12, a bladed turbine 20 and a bladed stator 22. The stator 22 is mounted on a one-way roller clutch 24 that is operatively connected to a grounded sleeve 26. The stator 22 has inner and outer shrouds 27 and 28 respectively, between which stator blades 30 are positioned at a predetermined angle as best seen in FIGS. 4 and 5. The inner shroud 27 of the stator is mounted on and secured to the outer periphery of an outer race 40 of the one-way roller clutch 24.

The outer race 40 has an internal surface with circumferentially spaced ramps 42 engaged by rollers 44 which in turn engage a cylindrical outer surface 45 of an inner race 46 which is splined to the grounded sleeve 26.

The inner race 46, outer race 40 and rollers 44 of the roller clutch 24 are disposed between an inwardly depending flange 47 of the stator 22 and an annular plastic thrust bearing 49 secured to the inner shroud 27 of the stator 22.

In lieu of individual tickler springs and a reaction cage used in conventional one-way roller clutches, the one-way roller clutch 24 has a roller energizer 48 for urging the rollers 44 to a position of incipient wedging engagement between the cams 42 and the cylindrical outer surface 44 of the respective clutch races.

Figure 6:
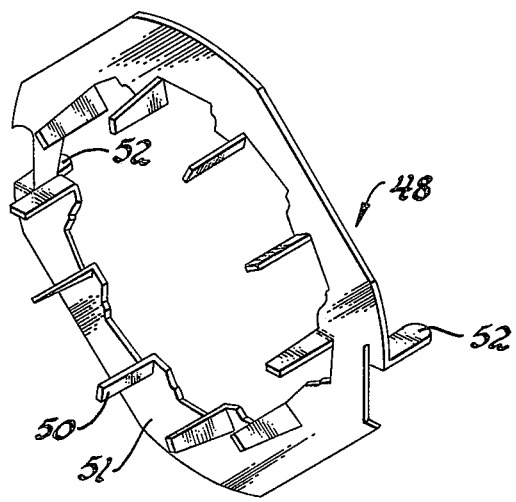
FIG. 6 is a perspective view of the roller energizer used in the torque converter shown in FIG. 1.

As shown in FIG. 6, the roller energizer 48 may comprise a sheet metal stamping of a flat generally annular form having a plurality of fingers 50 cut out and perpendicularly bent from the inner margin of its flat annular body 51 and a pair of diametrically opposed paddles 52 cut out from the outer margin and bent perpendicularly in the opposite direction.

Figure 2:
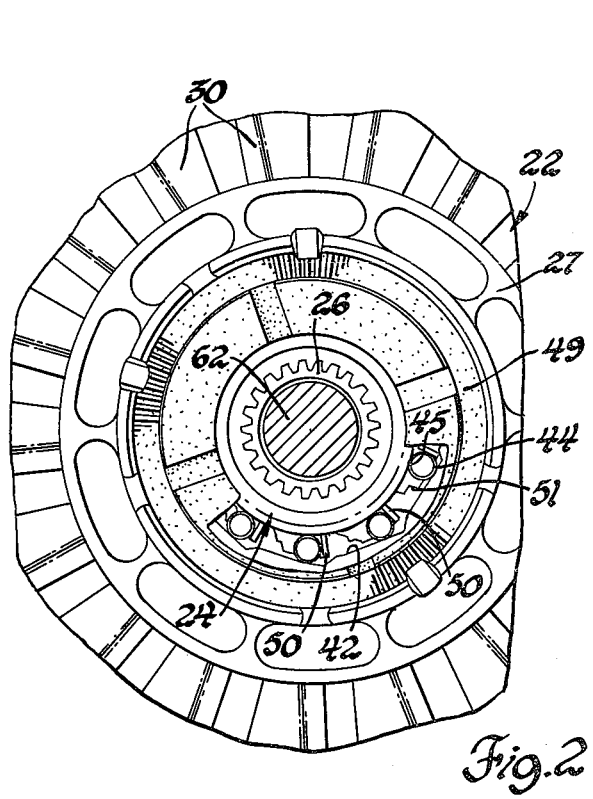
FIG. 2 is a section taken substantially along the line 2—2 of FIG. 1 showing the front side of the stator partially broken away to illustrate the internal details of the one-way roller clutch.
Figure 3:
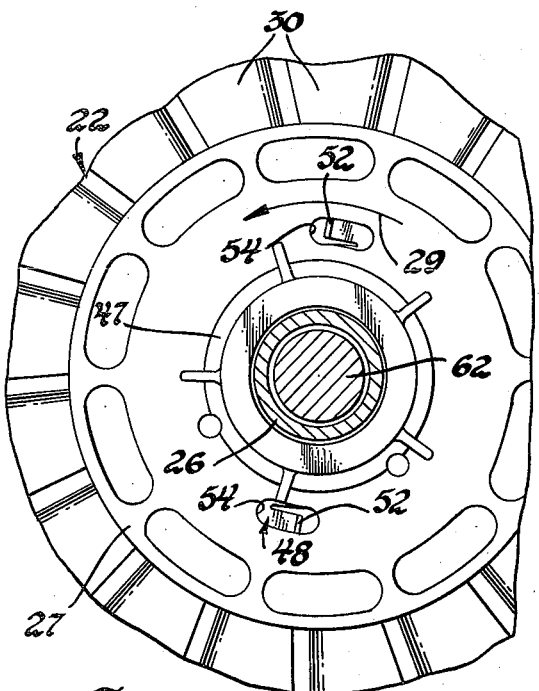
FIG. 3 is a section taken substantially along the line 3—3 of FIG. 1 showing the back side of the stator to illustrate the operative associate of portions of the one-way roller clutch.

Referring now to FIGS. 1, 2 and 3, the outer margin of energizer body 51 is rotatably disposed between the outer race 40 and the flange 47 of the stator 22 with the fingers 50 projecting into the annular space between the races 40 and 46 and individually engaging the rollers 44 to properly position them. The paddles 52 protrude through arcuate slots 54 in the stator flange 47 and are exposed to the oil in the area 25 of the hydrodynamic torque converter 14.

The turbine 20 is drivingly connected to a hub 60 which in turn is splined to the end of a driven shaft 62. This driven shaft extends from the hub rearwardly through the grounded sleeve 26 to a suitable transmission gear train or other drive mechanism, not shown.

The hydrodynamic torque converter 14 serves two primary functions. First, it acts as a fluid coupling to smoothly connect engine power through oil to the transmission gear train. Second, it multiplies torque from the engine when additional performance is desired.

The torque converter 14 consists of three basic elements: the bladed pump 16 (driving member), the bladed turbine 20 (driven or output member), and the stator 22 (reaction member) all of which are in an oil filled chamber which in this particular instance comprises housing 18 and the welded cover 12. The cover 12 is driven directly from the engine (now shown) through the input lug 10. The bladed pump 16 is therefore mechanically connected to the engine and turns at engine speed whenever the engine is operating.

When the engine is running, the bladed pump 16 is spinning in the clockwise direction as indicated by the arrow 17 in FIG. 4 and acts as a centrifugal pump picking up oil at its center and discharging this oil at its rim between the blades. The shape of the housing 18, pump shell 19 and blades 21 causes this oil to leave the pump spinning in a clockwise direction toward the blades of the turbine 20. As the oil strikes the turbine blades, it imparts a force to the turbine causing it to turn clockwise as indicated by the arrow 17a. When the engine is idling and the converter pump is not spinning fast, the force of the oil leaving the pump 16 is not great enough to turn the turbine 20 with any efficiency. This allows the vehicle to stand in gear with the engine idling. As the engine throttle is opened and the pump speed increases, the force of the oil increases and engine power is more efficiently transmitted to the turbine 20 and the gear train through shaft 62. After the oil has imparted its force to the turbine 20, the oil follows the contour of the turbine shell 31 and turbine blades 23 so that it leaves the center section of the turbine 20 spinning counterclockwise.

Because the turbine 20 has absorbed the force required to reverse the direction of the clockwise spinning oil, it now has greater force or torque than is being delivered by the engine. The process of multiplying engine torque through the converter has begun. If the counterclockwise spinning oil was allowed to continue to the inner section of the pump member, the oil would strike the blades of the pump in a direction that would hinder its rotation, thus cancelling out any gains in torque that would have been obtained. To prevent this from happening, a stator 22 is located between the central discharge of the turbine 20 and the central inlet of the pump 16. The stator 22 is mounted on a one-way roller clutch which allows the stator 22 to rotate clockwise but not counterclockwise. The force of the oil flowing from the turbine to the blades of the stator tends to rotate the stator counterclockwise as indicated by the arrow 17b, but the roller clutch 24 prevents it from turning in the counterclockwise direction.

The stator thus redirects the oil returning from the turbine 20 and changes its direction of rotation back to that of the pump 16 as best illustrated by the arrow 17c in FIG. 4 which illustrates the path of converter oil flow during the torque multiplying phase of operation. Consequently the oil is flowing in the clockwise direction in the area 25 of the torque converter inwardly of the stator shroud 28 and between the stator outlet and the pump inlet. The energy of the oil is then used to assist the engine in turning the pump 16. This increases the force of the oil driving the turbine 20 resulting in torque multiplication.

As turbine speed increases, the direction of the oil leaving the turbine changes to a clockwise direction as illustrated in FIG. 5 which illustrates the path of oil flow during the fluid coupling phase of operation. The oil then flows against the rear side of the stator blades in a clockwise direction. Since the stator would now impede the smooth flow of oil, the roller clutch 24 automatically releases and the stator revolves freely on its shaft in the clockwise direction as indicated by the arrow 17a and the oil flows unhindered through the stator 22 as best illustrated by the arrow 17e. Once the stator becomes inactive, there is no further multiplication of engine torque within the converter. At this point the converter is merely acting as a fluid coupling as both the converter pump and the turbine are turning at the same speed. In this fluid coupling mode of operation the oil in the area 25 between the stator discharge and the pump inlet is still flowing in the clockwise direction (counterclockwise when viewed from the rear of the stator as indicated by the arrow 29 in FIG. 3).

Thus in all modes of operation, the oil in the area 25 of hydrodynamic torque converter 14 is flowing in the clockwise direction. The paddles 52 of the clutch energizer 48 protrude into the area 25 and consequently are subjected to the clockwise flowing oil in all modes of operation. During the torque multiplying mode of operation, the oil impinging on the paddles 52 tends to rotate the roller energizer 48 clockwise relative to the stator 22 and thus the fingers 50 wedge the rollers 44 between the ramps 42 and the cylindrical surface 45 of clutch races preventing the stator 22 from rotating counterclockwise. During the fluid coupling mode of operation, the oil also flows in the clockwise direction. Since the oil flow in the clockwise direction is at the same speed as the freely rotating stator 22, the flowing oil maintains the roller energizer 24 in the position where the fingers 50 locate the rollers 44 in a position of incipient wedging engagement which position while allowing the stator 22 to rotate freely in the clockwise direction also causes the clutch 24 to immediately lock up in response to forces tending to rotate the stator 22 in the opposite direction.

Thus it can be seen that my invention provides a much simpler roller clutch by advantageous use of the fluid flow conditions within the torque converter which makes it possible to replace the tickler springs and reaction cage with a simple sheet metal stamping.

I wish it to be understood that I do not desire to be limited to the exact details of construction shown and described for obvious modifications will occur to a person skilled in the art.

What is claimed is:

1. In a hydraulic torque converter having a bladed pump and a bladed turbine discharging hydraulic fluid into the inlet of the bladed pump through a bladed stator operatively connected to a ground sleeve by a one-way roller clutch for providing torque multiplying and fluid coupling modes of operation, the improvement comprising:

a roller energizer for locating the rollers of said roller clutch at a position of incipient wedging engagement with the clutch races responsive to the flow of hydraulic fluid in said hydraulic torque converter during the operation thereof, said roller energizer being mounted in said torque converter for rotation relative to said clutch races and having a plurality of fingers individually engaging said rollers and a plurality of paddles disposed in the hydraulic fluid between the outlet of said stator and the inlet of said pump.

2. In a hydraulic torque converter having a bladed centrifugal pump with a central inlet and an outer discharge and a coaxially disposed turbine having an outer inlet and a central discharge discharging hydraulic fluid into the central inlet of the bladed centrifugal pump through a coaxially disposed bladed stator non-rotatably mounted on an outer race of a one-way roller clutch having an inner race carried by a coaxial ground sleeve, the improvement comprising:

a roller energizer for locating the rollers of said roller clutch at a position of incipient wedging engagement with the clutch races responsive to the flow of hydraulic fluid in said hydraulic torque converter during the operation thereof, said roller energizer comprising a flat body portion rotatably mounted on said bladed stator next to a depending radial flange of said bladed stator which flange is exposed to the hydraulic fluid between said bladed stator and the central inlet of said bladed pump, said roller energizer further comprising a plurality of generally axial fingers projecting from said body and individually engaging the rollers of said roller clutch and a plurality of paddles projecting from said body in the opposite direction, said paddles protruding through arcuate slots in said flange and having portions exposed to the hydraulic fluid in the area between said bladed stator and the central inlet of said bladed pump, said hydraulic fluid in said area flowing in the same circumferential direction during all modes of operation of said torque converter and impinging on said paddles to cause said roller energizer to locate said rollers at a position of incipient wedging engagement with said races.

* * * * *